D. F. BUSSKOHL.
ANIMAL POKE.
APPLICATION FILED AUG. 28, 1919.
1,332,484.
Patented Mar. 2, 1920.
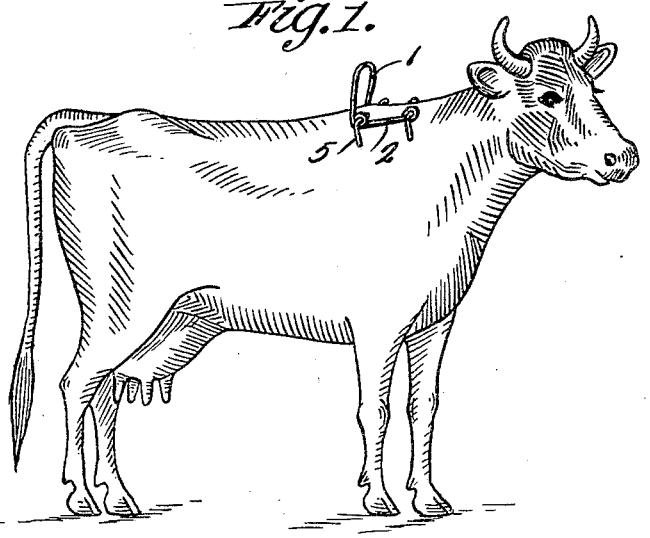
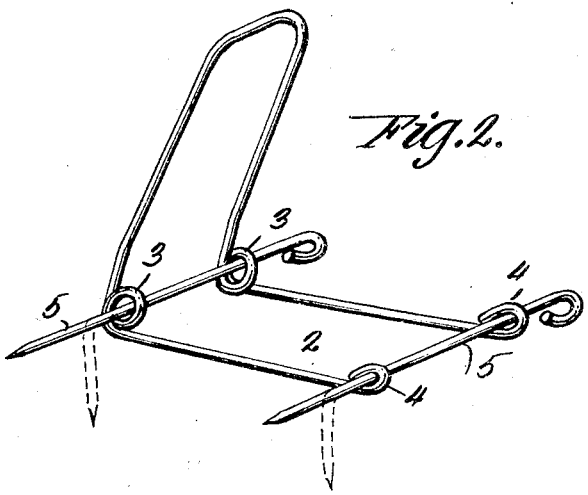
WITNESSES
Guy M. Spring
U. B. Hillyard.
Inventor
DICK F. BUSSKOHL
By Richard B. Owen
Attorney

UNITED STATES PATENT OFFICE.

DICK F. BUSSKOHL, OF PEDRO, SOUTH DAKOTA.

ANIMAL-POKE.

1,332,484. Specification of Letters Patent. Patented Mar. 2, 1920.

Application filed August 28, 1919. Serial No. 320,360.

*To all whom it may concern:*

Be it known that I, DICK F. BUSSKOHL, a citizen of the United States, residing at Pedro, in the county of Pennington and State of South Dakota, have invented certain new and useful Improvements in Animal-Pokes, of which the following is a specification.

The invention relates to the type of devices adapted to be attached to the hide of an animal to prevent it from leaving an inclosure by passing between, over or under the inclosing elements, such as fence wires.

The purpose of the invention is the provision of a device which is simple and light in structure and which may be easily and readily applied to or disconnected from the animal as may be required and which is light and effective for the purpose intended.

The drawings illustrate a preferred embodiment of the invention. However, it is to be understood that in adapting the same to meet different conditions, various changes in the form, proportion, and minor details of construction may be resorted to without departing from the nature of the invention as claimed hereinafter.

Referring to the drawings,

Figure 1 is a perspective view showing the invention applied.

Fig. 2 is a perspective view of the device.

Corresponding and like parts are referred to in the following description and indicated in both views of the drawings by like reference characters.

The device is commonly designated as an animal poke and in the present instance is constructed solely of wire of suitable gage and material, a length of wire being doubled upon itself and bent intermediate of its ends to provide angularly disposed portions 1 and 2. When the device is in position, the loop-shaped portion 1 extends upwardly, whereas the parallel members comprising the portion 2 extend horizontally upon opposite sides of the back of the neck. Eyes 3 are formed at the juncture of the portions 1 and 2 and other eyes 4 are provided at the extremities of the members comprising the portion 2. Pins 5 extend through the respective eyes 3 and 4 and serve as fastening means to secure the device to the animal. By having the device constructed of a single length of wire, no joints are present and the structure is light. Moreover, the upright portion 1 may be adapted to yield so as to obviate any serious injury to the animal in the event of the head being thrust quickly through an inclosure. The portions of the wire bent to form the eyes 3 also result in permitting the upright portion 1 to yield, since the parts 3 perform the double function of eyes and spring coils. The pins 5 consist of lengths of wire pointed at one end and having the opposite end bent into the form of an eye which will prevent the pin from passing through the eyes 3 and 4.

While the device is shown applied to the back of the neck, it is to be understood that it may be attached to the brisket, if desired. When placing the device in position, the hide is drawn upward and the poke so disposed that the elements comprising the portion 2 extend along opposite sides of the elevated part of the hide, after which the pins 5 are passed through the eyes 3 and 4 and through the portion of the hide disposed between the said eyes and the members comprising the portion 2. The pointed ends of the pins are bent, as indicated by the dotted lines in Fig. 2 and the full lines in Fig. 1 to prevent withdrawal of the pins and insure permanency of the device so long as the same is required for service. Should it be required to remove the device, the bent ends of the pins 5 are straightened and the pins withdrawn after which the device may be readily displaced, as will be readily understood.

Having thus fully described my invention, what I claim as new and desire to secure by Letters Patent is:—

An animal poke, consisting of a length of wire doubled upon itself into the form of a loop and bent intermediate of its ends to form relatively upright and horizontal portions and having eyes at the extremities of the elements comprising the horizontal portion and at the juncture of the upright and horizontal portions and pins adapted to pass through the respective eyes for securing the device to the animal.

In testimony whereof I affix my signature in presence of two witnesses.

DICK F. BUSSKOHL.

Witnesses:
C. A. FOSTER,
ANNA J. BUSSKOHL.